INVENTOR
D. R. HERRIOTT
BY
Roderick B. Anderson
ATTORNEY

United States Patent Office 3,495,185
Patented Feb. 10, 1970

3,495,185
FREQUENCY STABILIZATION APPARATUS
Donald R. Herriott, Morris Township, Morris County, N.J., assignor to Bell Telephone Laboratories, Incorporated, New York, N.Y., a corporation of New York
Filed Mar. 31, 1966, Ser. No. 539,126
Int. Cl. H01s 3/10
U.S. Cl. 331—94.5           3 Claims

ABSTRACT OF THE DISCLOSURE

Laser stabilization apparatus comprises an electro-optic switch for circularly polarizing the laser optical output and for alternately changing the direction of circular polarization. An absorption cell absorbs the two polarized components as a function of frequency. A phase sensitive demodulator generates a correction signal as a function of any amplitude difference of the two components, and the correction signal adjusts the length of the laser optical cavity. Two output modes are generated by the laser which are symmetrically centered about the maximum gain frequency of the laser.

---

Figure 1:
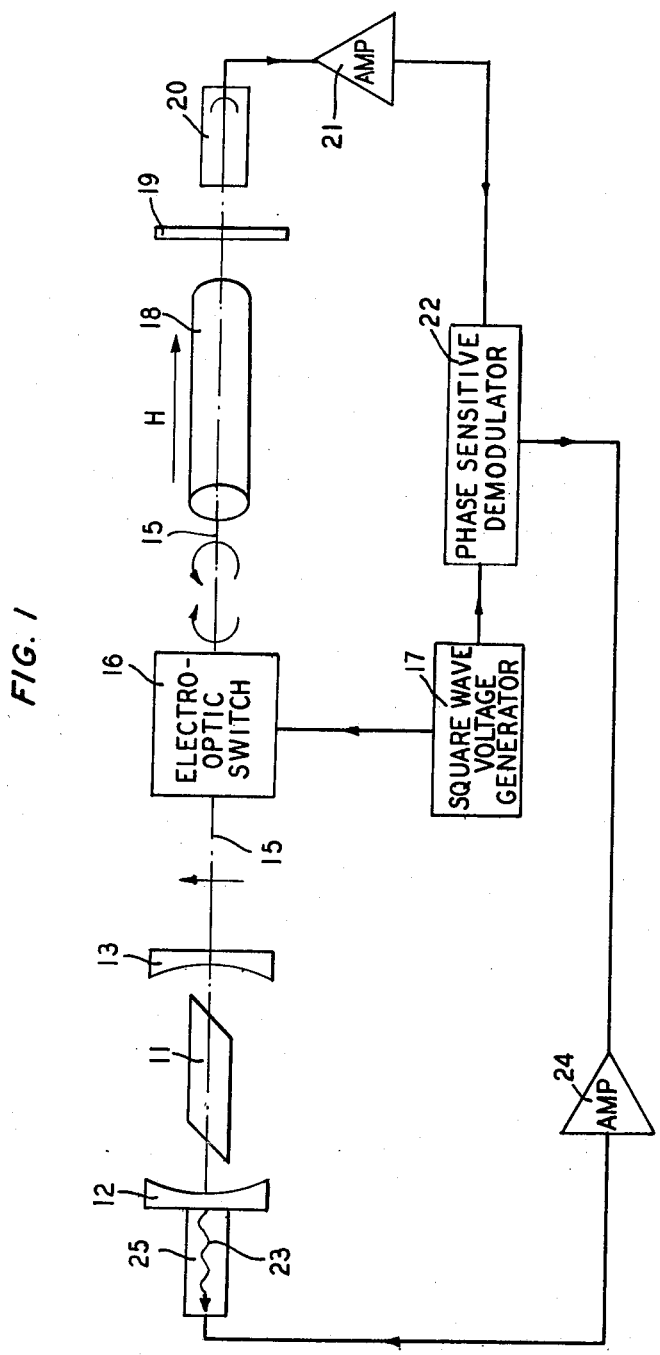

This invention relates to lasers, and more particularly, to apparatus for stabilizing the output frequency of laser oscillators.

In a paper by E. I. Gordon, E. F. Labuda, and A. D. White, entitled "Frequency Stabilization of Single Mode Gas Lasers," Applied Physics Letters, vol. 5, No. 5, p. 97, Sept. 1, 1964, servomechanism apparatus for stabilizing the output of a laser oscillator is described. The output of a single mode gas laser is directed through an electro-optic switch and a gas plasma absorption cell to a photodetector. A square wave voltage generator excites the electro-optic switch to circularly polarize the output laser light alternately in the left-hand and right-hand direction. The absorption cell then absorbs part of the light as a function of frequency, so that the light intensity on the photodetector is indicative of the output light frequency, or more specifically, an indication of the deviation of the frequency from a desired reference. The frequency characteristic of the absorption cell, however, is different with right-hand and left-hand circularly polarized light, so that the relative intensities of the right- and left-hand circularly polarized light on the photocell is indicative of the direction of frequency deviation of the laser output; for example, predominant absorption of right-hand circularly polarized light indicates an output frequency that is lower than the desired reference, while predominant absorption of left-hand polarized light indicates a frequency that is higher than desired. As a result, the intensity of any square wave output of the photocell is indicative of magnitude of frequency deviation, while the phase of the output is indicative of the direction of frequency deviation.

The output of the photodetector is homodyne demodulated in a phase sensitive demodulator to which the square wave generator is connected as a reference. The demodulator output is then a D–C correction signal, the amplitude of which is indicative of frequency deviation, with the polarity being indicative of the direction of deviation. The correction signal is transmitted to a piezoelectric transducer which controls the axial position of one of the mirrors of the laser optical cavity and therefore controls the frequency output of the laser. This apparatus, along with various other embodiments, is also described in the copending patent application of Gordon-Labuda-White, Ser. No. 376,960, filed June 22, 1964, and assigned to Bell Telephone Laboratories, Inc.

I have found that by choosing the length of the optical cavity so that two modes of oscillation occur within the frequency range of output of the laser, the stability of the apparatus is substantially enhanced. When the frequencies of the two modes are symmetrically disposed above and below the center frequency of the laser output, the demodulator described above does not release a corrective signal, and the laser delivers a stable output at the two mode frequencies. The slightest deviation of the laser output from these two predetermined specific frequencies generates a large corrective signal that immediately tunes the laser cavity to center symmetrically the resonator modes about the center frequency. The increased sensitivity of my stabilization apparatus results from a strong competition of the two resonator modes for the same laser energy when they are symetrically disposed around the center frequency. Hence, any small change in frequency shifts a large part of the lasser energy to one of the two modes which results in an exaggerated corrective signal.

Figure 2:
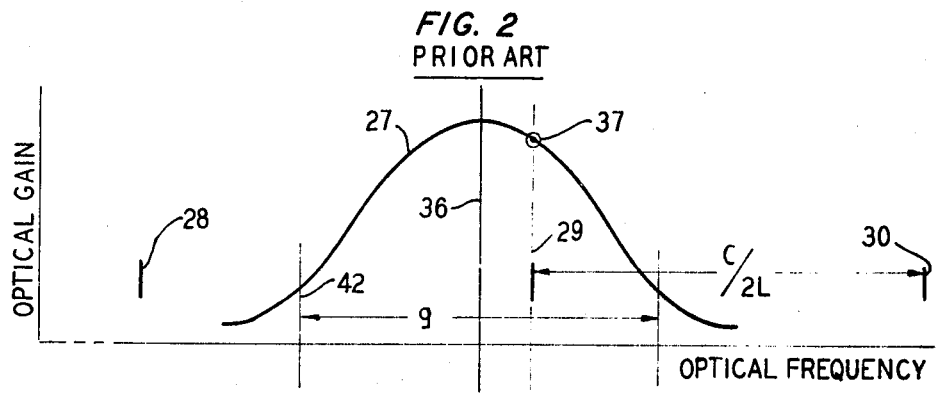
Figure 3:
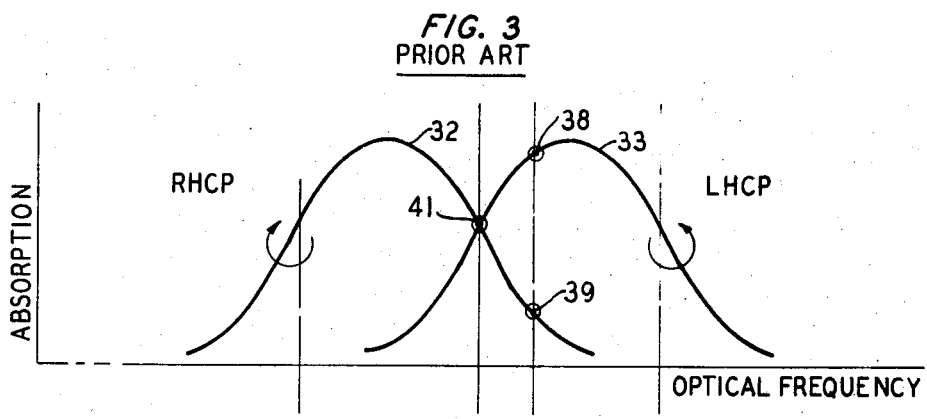
Figure 4:
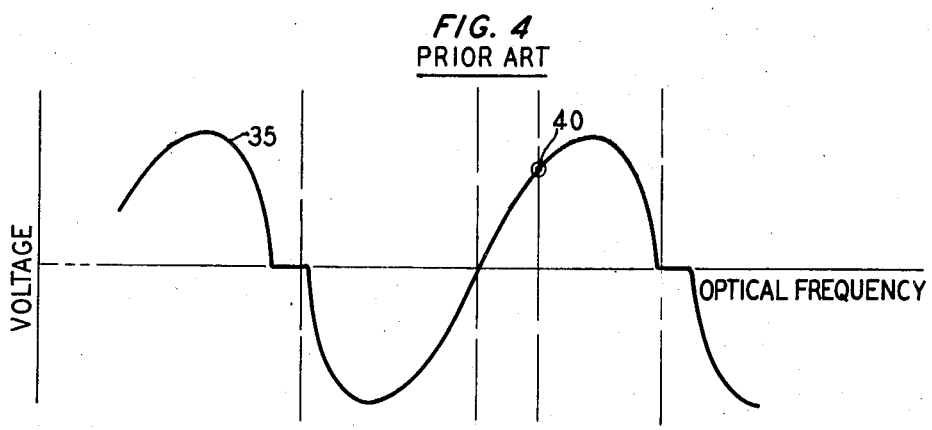
Figure 5:
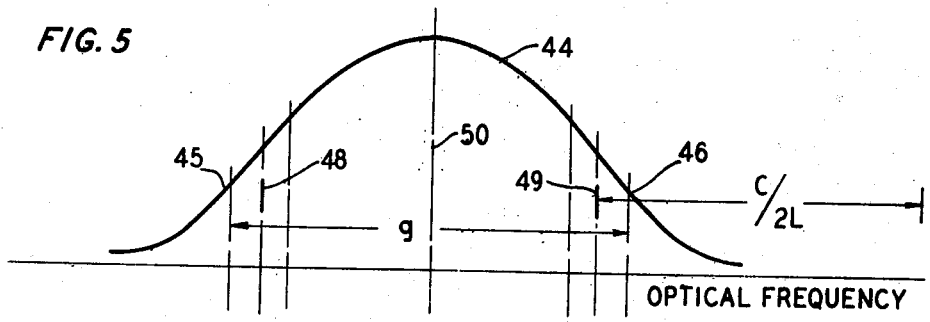
Figure 6:
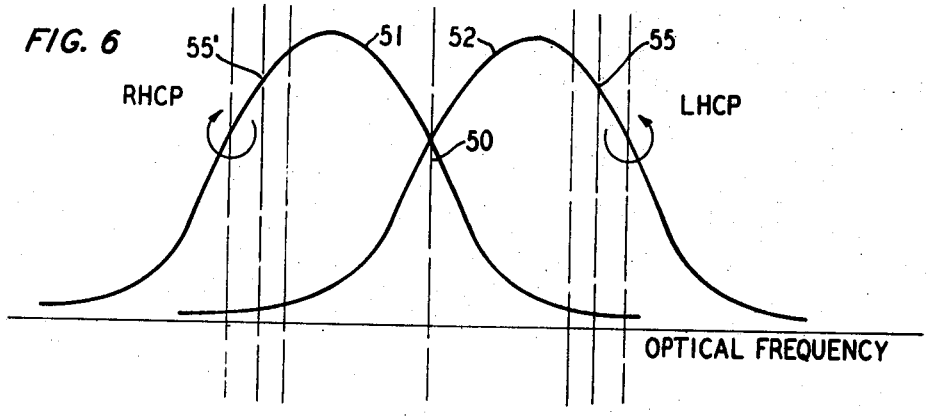
Figure 7:
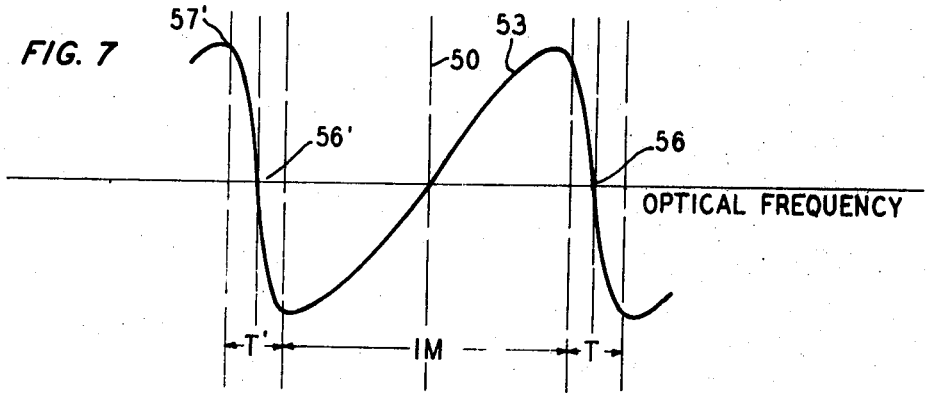

These and other objects and features of my invention will be better appreciated from a consideration of the following detailed description taken in conjunction with the accompanying drawing in which:

FIG. 1 is a schematic illustration of laser frequency stabilization apparatus which may be used either in accordance with the prior art, or in accordance with the present invention;

FIGS. 2, 3, and 4 are respectively graphs showing variation with optical frequency of laser gain, absorption by the absorption cell, and correction signal voltage of the apparatus of FIG. 1 when operated in accordance with the prior art; and FIGS. 5, 6, and 7 respectively illustrate variations with respect to optical frequency of laser gain, absorption by the absorption cell, and correction signal voltage of the apparatus of FIG. 1 when operated in accordance with the present invention.

Referring now to FIG. 1, there is shown laser stabilization apparatus of the type described in the aforementioned Gordon et al. publication and the Gordon et al. patent application. A gas laser 11 is included within an optical cavity resonator defined by mirrors 12 and 13. The mirrors 12 and 13 are partially transparent so that generated light energy from the laser is derived along paths 23 and 15. The energy of path 23 constitutes the useful optical output of the apparatus while the light of path 15 is directed through an electro-optic switch 16 which is connected to a square wave generator 17. The purpose of the switch 16 is to transform the plane polarized output light of the laser to alternately left-hand and right-hand circularly polarized light as is shown by the arrows along path 15.

The laser output light is then directed through an absorption cell 18 and a filter 19 to a photodetector 20. The photodetector 20 generates an electrical output as a function of light intensity, the electrical output being directed through an amplifier 21 to a phase sensitive demodulator 22. The square wave output of generator 17 is used as a reference for homodyne demodulating the output of detector 20 which generates a correction signal. The polarity and the magnitude of the correction signal indicate the direction and extent of frequency deviation of the laser output from a predetermined mean. The correction signal is then directed through an amplifier 24 to a piezoelectric transducer 25 that is mounted on the mirror 12. The transducer 25 axially moves the mirror 12 in response to the applied corrective signal to tune the laser optical cavity and thereby control the frequency of the laser output.

The improvement of my invention can be best understood by considering the operation of the Gordon et al. apparatus with reference to the curves of FIGS. 2, 3, and 4, which are drawn with common frequency abscissas to aid in projection and comparison. Referring to FIG. 2, curve 27 represents the Doppler-broadened gain versus frequency of the laser oscillator 11. The oscillator frequency range $g$ over which the laser 11 is capable of generating light extends over the region on the curve 27 at which the laser gain is greater than unity. The frequencies at which the optical cavity is resonant are indicated by mode lines 28, 29, and 30. The oscillation modes of the optical cavity are each separated by a frequency equal to $c/2L$, where $c$ is the velocity of light, and $L$ is the cavity length. The separation of adjacent cavity modes $c/2L$ is greater than the oscillation frequency range $g$. The laser of Gordon et al. is therefore a single-mode laser; that is, it generates output energy at only a single frequency because only one cavity oscillation mode can occur within the oscillation frequency range $g$.

The absorption cell 18 of FIG. 1 comprises a gas discharge immersed in a magnetic field H. The magnetic field gives rise to an effect known as Zeeman splitting which results in absorption of light energy as a function of both frequency and direction of circular polarization of the light. Referring to FIG. 3, curve 32 shows the absorption with respect to frequency of right-hand circularly polarized light (RHCP) while curve 33 illustrates the absorption in the absorption cell of left-hand circularly polarized light (LHCP). Hence, the absorption cell provides two discrete absorption channels represented by curves 32 and 33 each of which operate on the laser output.

Curve 35 of FIG. 4 represents the varying correction signal of demodulator 22 resulting from the varying absorption in the absorption cell. The purpose of the apparatus is to maintain the output of the laser at the center frequency of its gain curve shown by frequency line 36. When the optical cavity is resonant at the frequency shown by mode line 29 of FIG. 2, the absorption of left-hand and right-hand circularly polarized light is given respectively by points 38 and 39 of FIG. 3. The correction signal is proportional to the difference of intensities of the right-hand and left-hand circularly polarized light quantities. Since the absorption of the right-hand circularly polarized light (point 39) is much smaller than the absorption of the left-hand polarized light (point 38), a correction signal of positive polarity will be generated as shown by point 40 of FIG. 4. Because the correction signal is of positive polarity, it excites the transducer 25 to lengthen the optical cavity and reduce the output frequency so that it approaches the center frequency shown by line 36 of FIG. 2. When the mode line reaches coincidence with the center frequency 36, the absorption of the two curves 32 and 33 are equal as shown by their intersection point 41, and the correction signal of curve 35 is zero. It can be seen that if the output frequency were smaller than frequency 36, a generated correction signal would be of negative polarity which would shorten the cavity to raise the frequency. Hence, the apparatus is effective for stabilizing the output of the laser at the center frequency 36.

Examination of the correction signals generated at varying laser output frequencies shows that the signal characteristic is cyclical as shown in FIG. 4. For example, if the optical cavity were tuned such that mode 29 were moved to the left to cutoff frequency 42 of FIG. 2, the correction signal would be zero because the laser would have stopped oscillating. If the cavity were tuned to move mode 29 even further to the left, the laser would again begin oscillation when mode 30 of FIG. 2 moved into frequency range $g$, and a correction signal would again be generated. As will be seen later, with my laser, there is no total cut-off as the optical cavity resonance frequencies are changed.

In accordance with my invention, the optical cavity defined by mirrors 12 and 13 of FIG. 1 is made sufficiently long to support two modes of oscillation within the laser frequency range $g$. This condition is illustrated in FIG. 5 wherein curve 44 is the Doppler-broadened gain versus frequency curve of the laser, points 45, 46 are the cut-off frequencies, and $g$ is the laser operating frequency range. Two optical cavity modes 48 and 49 are located within range $g$. As before, the frequency separation of adjacent modes is equal to $c/2L$ but, in this case, the separation is smaller than $g$. As will be explained below, the stabilization apparatus of FIG. 1 maintains modes 48 and 49 symmetrically disposed about the center frequency 50 with a much higher degree of stability than has formerly been attainable.

As before, the absorption cell constitutes two absorption channels having overlapping frequency characteristics 51 and 52 which intersect at the center frequency 50 as shown in FIG. 6. The output of the demodulator 22, when operated with my two-mode laser, is represented by curve 53 of FIG. 7.

With the modes 48 and 49 symmetrically disposed about center frequency 50 as shown, the absorption of right-hand and left-hand circularly polarized light is equal as shown by points 55 and 55' of FIG. 6. As a result, the correction signal is zero as shown by points 56 and 56' of FIG. 7. If the frequencies of modes 48 and 49 change slightly, a large correction signal is generated as indicated by the steep slope of curve 53 in the region of T and T' of points 56 and 56'.

If the optical cavity were manually tuned to move modes 48 and 49 to the left, the correction signal would increase, and mode 48 would reach the cut-off frequency 45 of FIG. 5. If the cavity frequency were decreased further, the laser would operate in only a single frequency mode and the correction signal would vary over the range 1M of FIG. 7. A further frequency decrease would cause another mode to enter the oscillation frequency range $g$ of FIG. 5 so that the laser again would deliver an output at two frequencies. The foregoing discussion contrasts the correction signal curve 53 of a double mode laser with a correction signal curve 35 of a single mode laser. It should be noted that in a two-mode laser the frequency separation of adjacent optical cavity modes $c/2L$ is smaller than the oscillation frequency range $g$ of the laser, but the separation of alternate modes $c/L$ is greater than $g$.

The steep slope of curve 53 in the range T over which the two-mode laser is tuned results from strong competition between the laser output components at the mode frequencies 48 and 49 of FIG. 5 for the same energy in the inverted population of the laser medium. The output power of the laser is divided equally between the two frequencies only so long as they are symmetrically disposed about the center frequency 50. As they become non-symmetrically disposed, the frequency closer to the line center 50 begins to assume a greater proportion of the output energy at the expense of the other frequency. For example, referring to FIG. 5, if modes 48 and 49 shift slightly to the left in frequency, a greater proportion of the output power exists at the frequency of mode 49 than at mode 48 and much more left-hand circularly polarized light is absorbed by the absorbing cell than would be the case if the laser power at frequency 49 remained constant. Likewise, the right-hand circularly polarized light which is absorbed is much smalller than would be the case if the power at the frequency of mode 48 remained constant. As a result, the changes of light intensity detected by detector 20 of FIG. 1 are greatly exaggerated, and the slope of curve 53 of FIG. 7 is much steeper than is the case for single mode operation.

The extent of this mode competition depends upon a number of tube parameters such as the constituency and density of the laser medium. A discussion of mechanism of mode competition and the relevant tube parameters which affect it is given in the paper "Mode Competition and Collision Effects in Gaseous Optical Masers," by R. L. Fork and M. A. Pollock, Physical Review, vol. 59, No. 5A, page A1408, Aug. 20, 1965. The paper also describes how spurious oscillation of the laser resulting from a periodic energy transfer between the two cavity modes can be avoided.

From the foregoing, it can be appreciated that the optical output of a two-mode laser in accordance with my invention is much more stable than that of the single mode laser of the prior art. This is because the slope of curve 53 in the tuning range T of FIG. 7 is much steeper than the comparable slope illustrated in FIG. 4. Apparatus has been built for stabilizing a two-mode 6328 angstrom helium-neon laser having a gas pressure of 3.6 millimeters of mercury, a 7–1 ratio of the two gases, a central tubulation inner diameter of 1.5 millimeters, and optical cavity length of approximately 18 centimeters. The two output frequencies are separated by less than one angstrom unit of wavelength. The slope in the tuning range T of FIG. 7 was approximately 40 times greater than that in the single mode region 1M. The tuning region T extended over only 30 megacycles, while the region 1M extended over 803 megacycles. With a square wave generator frequency of 400 cycles per second, the output laser frequency was found to be stable to better than 5 parts in $10^{10}$ parts. Under the same conditions, a single mode laser of the prior art could be expected to deliver an optical frequency that is stable to only 2 parts in $10^9$ parts.

It is to be understood that the apparatus of FIG. 1 is shown as only one example of various servo-mechanisms which could be used with the two mode laser of the invention. Several alternatives are described, for example, in the aforementioned Gordon et al. patent application. Various other modifications and embodiments may be made by those skilled in the art without departing from the spirit and scope of the invention.

What is claimed is:
1. Laser frequency stabilization apparatus comprising:
    a laser for generating optical energy over a predetermined oscillation frequency band, and having a center frequency of maximum laser gain;
    said laser comprising an optical cavity having a length which is appropriate for giving cavity resonances at a plurality of modes each of different resonant frequencies;
    the frequency separation of adjacent modes being smaller than the oscillation frequency band;
    means forming two absorbing channels for absorbing the optical output of the laser as a function of frequency;
    means for comparing the absorption of the two channels and for generating a correction signal;
    and means comprising an optical cavity tuning element for symmetrically disposing in terms of frequency two of the optical cavity modes about the center frequency of maximum laser gain in response to said correction signal.
2. The laser apparatus of claim 1 wherein:
    the frequency separation of alternate modes is larger than the oscillation frequency band.
3. The laser apparatus of claim 1 further comprising:
    means for circularly polarizing the optical output and for alternately changing the direction of circular polarization;
    and wherein the two absorbing channels have overlapping frequency characteristics and each absorb optical output of only one direction of circular polarization.

References Cited
UNITED STATES PATENTS 3,361,990  1/1968  Gordon et al. _____ 331—94.5

OTHER REFERENCES

McFarlane, "Frequency Pushing and Frequency Pulling in a He-Ne Gas Optical Maser," Phys. Rev. 135, (3A), Aug. 3, 1964, pp. A543–A550.

"Fluctuations in the Polarization and Frequency of a He-Ne Laser" (in French), M. Dumont et. G. Durand, Compt. Rend. Acad. des Sci., v. 257, Nov. 13, 1963, pp. 2974–6.

"Frequency Stabilization of Single Mode Gas Lasers," A. White et al. App. Phis. Lett. 5, 5, Sept. 1, 1964, pp. 97–98.

"Frequency Stabilization of Double-Mode Gas Laser," H. Goldick, Proc. of the IEEF, 53, June 1965, p. 638.

"Mode Competition and Collision Effects in Gaseous Optical Masers," R. Fork & M. Pollack, Phys. Rev. 139, 5A, Aug. 30, 1965, pp. A1408–1414.

"An Introduction to Lasers and Masers," A. Siegman, McGraw-Hill, New York, 1968,—see ESP. pp. 9–8 thru 9–10.

"Laser Systems and Applications," H. Elion, Pergamon Press, New York, 1967,—see esp. pp. 39–43.

RONALD L. WIBERT, Primary Examiner

R. J. WEBSTER, Assistant Examiner

U.S. Cl. X.R.
250—199